E. E. JOSEF.
Wheel and Pulley.

No. 229,138.  Patented June 22, 1880.

UNITED STATES PATENT OFFICE.

EDWARD E. JOSEF, OF BUFFALO, NEW YORK.

WHEEL AND PULLEY.

SPECIFICATION forming part of Letters Patent No. 229,138, dated June 22, 1880.

Application filed December 5, 1879.

*To all whom it may concern:*

Be it known that I, EDWARD ERNST JOSEF, of Buffalo, in the county of Erie and State of New York, have made certain Improvements in Wheels and Pulleys, of which the following is a specification.

This invention relates more particularly to wheels and pulleys used for belting for machinery purposes, the object of the invention being to get a very light, but at the same time very strong, pulley; and the invention consists in employing two disks, preferably of thin metal, with concave sides, each with a flange on its outer edge meeting together and forming the periphery of the pulley or wheel, and having set inside a thin metal ring abutting against the flanges, forming a foundation, which prevents the flanges from pressing inward.

It also consists in a collar and sleeve to which the disks are fastened in the center, forming the hub, and by which they are fastened to the shafting or axle, &c., all as hereinafter fully set forth.

Figure 1:
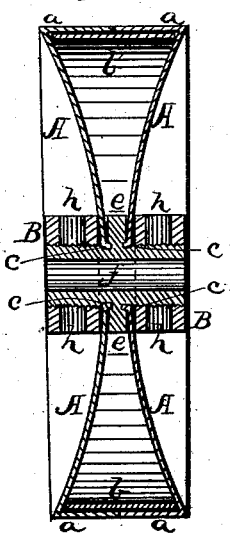
Figure 2:
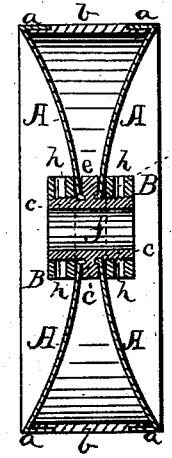

In the drawings, Figure 1 is a vertical cross-section through the center of the pulley; Fig. 2, a vertical cross-section of the same, with narrow flanges and wider ring.

A A represent two disks of spun or stamped thin metal, concaving to the center, where a hole is left for the admission of the parts forming the hub, &c. These disks have each a flange, *a a*, projecting inward at right angles to the disks, and together forming the periphery of the wheel or pulley. To keep them in place and prevent collapsing, a thin metal ring, *b*, is set inside the wheel against the flanges, which gives a foundation and prevents inward pressure.

Around the center hole of each disk is a small flange, *c*, which gives a wider bearing and projects into a recess in the collar *e* on the sleeve *f*. This collar acts as a washer between the two disks.

Both ends of the sleeve are screw-threaded, and with nuts B to clamp independently each disk against the inner collar, thus forming an inside and outside support or hub. Through the periphery of these nuts are a series of holes, *h h*, which not only lighten the nuts, but serve to screw it onto the sleeve by a wrench, and also to insert one or more set-screws to secure the pulley on the shaft. These holes may be threaded, and the holes will continue through the sleeve to give the set-screw a hold on the shaft.

To make wide-faced pulleys the inside ring would be widened, as desired. The flanges of the disks would then be narrow, and, instead of meeting, would be properly joined to or fitted over the edges of the ring *b*. (See Fig. 2.) This would give pulleys to suit the varying widths, as might be desired. The outside disks or frames, A, could then be used for a great variety of pulleys by merely having a number of rings or bands, *b*, of various widths, also the collar on the sleeve widened.

The sides of the wheel, being made concave, allow the hub being made the same width as the periphery of the wheel, besides giving greater stiffness and strength and allowing a loose pulley to run beside it without interference.

This construction gives a hollow wheel of great lightness and strength, dispensing with lathe-work, and thus cheapening its cost. Being made of thin metal gives uniform thickness and a uniform balance—an important consideration in rapid-moving machinery, making it also impossible to burst it. It being a closed wheel also gives greater safety to those operating or near the machinery. It obviates the great objection to the present styles of belt wheels and pulleys—viz., weight—an important thing in a line of shafting.

I claim—

1. The combination of the inside foundation-ring, *b*, and the two flanged disks A A *a a*, forming the frame-work of the wheel, all substantially as and for the purpose specified.

2. A wheel or pulley consisting of the two disks A A, with the rim-flanges *a a* and center flanges, *c c*, the sleeve *f*, collar *e*, recess, nuts B B, and ring *b*, all constructed and arranged substantially as and for the purpose specified.

In witness whereof I have hereunto signed my name in the presence of two subscribing witnesses.

EDWARD ERNST JOSEF.

Witnesses:
J. R. DRAKE,
T. H. PARSONS.